(12) United States Patent
Kaihara et al.

(10) Patent No.: US 9,694,692 B2
(45) Date of Patent: Jul. 4, 2017

(54) VEHICLE CONTROLLING SYSTEM

(71) Applicant: MITSUBISHI JIDOSHA KOGYO KABUSHIKI KAISHA, Tokyo (JP)

(72) Inventors: Kuniaki Kaihara, Tokyo (JP); Shohei Kawano, Tokyo (JP); Hiroyuki Sakai, Tokyo (JP); Atsushi Kodama, Tokyo (JP); Yuya Suzuki, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 329 days.

(21) Appl. No.: 14/637,523

(22) Filed: Mar. 4, 2015

(65) Prior Publication Data

US 2015/0251543 A1 Sep. 10, 2015

(30) Foreign Application Priority Data

Mar. 5, 2014 (JP) ................................ 2014-042534

(51) Int. Cl.
*B60L 11/08* (2006.01)
*B60L 11/18* (2006.01)

(52) U.S. Cl.
CPC ........... *B60L 11/08* (2013.01); *B60L 11/1803* (2013.01); *B60L 11/1868* (2013.01); *B60L 2210/10* (2013.01); *B60L 2240/545* (2013.01); *Y02T 10/70* (2013.01); *Y02T 10/7005* (2013.01); *Y02T 10/7066* (2013.01); *Y02T 10/7077* (2013.01); *Y02T 10/7216* (2013.01)

(58) Field of Classification Search
CPC ...................................................... B60L 11/08
See application file for complete search history.

(56) References Cited

U.S. PATENT DOCUMENTS 6,318,487 B2 * 11/2001 Yanase ..................... B60K 6/46
180/65.245
9,145,061 B2 * 9/2015 Wada ....................... B60K 6/46

FOREIGN PATENT DOCUMENTS

JP 2012-214142 A 11/2012

* cited by examiner

*Primary Examiner* — Jeffrey Zweizig
(74) *Attorney, Agent, or Firm* — Birch, Stewart, Kolasch & Birch, LLP

(57) ABSTRACT

A vehicle controlling system includes a high-voltage circuit including a motor for driving a vehicle and a generator driven by an engine; an intermediate-voltage circuit including a battery and having a potential lower than the potential of the high-voltage circuit; a low-voltage circuit having a potential lower than the potential of the intermediate-voltage circuit, accessories being disposed to the low-voltage circuit; a transformer disposed between the high-voltage circuit and the intermediate-voltage circuit; and a down converter disposed between the intermediate-voltage circuit and the low-voltage circuit. The controlling system further includes a generator controller to control the generator such that the generator generates power equal to or higher than the sum of power consumed by the motor and power output from the transformer to the intermediate-voltage circuit at a temperature of the battery lower than a predetermined temperature, and a transformer controller to control the transformer such that the transformer outputs power equal to or lower than power output from the down converter to the low-voltage circuit at a temperature of the battery lower than the predetermined temperature.

6 Claims, 3 Drawing Sheets

VEHICLE CONTROLLING SYSTEM

CROSS-REFERENCE TO THE RELATED APPLICATION

This application incorporates by references the subject matter of Application No. 2014-042534 filed in Japan on Mar. 5, 2014 on which a priority claim is based under 35 U.S.C.§119(a).

FIELD

The present invention relates to a controlling system for a hybrid vehicle including a motor for driving the vehicle and a generator driven by an engine.

BACKGROUND

The performance of electric batteries installed in vehicles for driving the vehicles varies depending on the environmental temperature in use. For example, the charging-discharging efficiency of electric batteries at low temperature is lower than that at ordinary temperature. Cases for the electric batteries thus include thermosensors in addition to electric heaters to maintain the temperature of the batteries within a predetermined range.

In hybrid vehicles including motors for driving the vehicles by both the power from generators driven by engines and the power charged in electric batteries, the motors can be driven by the generated power alone even if at low battery temperature. Conventional controlling apparatuses warm electric batteries while driving vehicles by the power from generators.

For example, a typical controlling apparatus warms an electric battery while driving a vehicle through the supply of generated power to an electric heater and a motor. Alternatively, the electric battery may be warmed by the Joule heat generated during the charge-discharge cycles of the electric battery (refer to Japanese Unexamined Patent Application Publication No. 2012-214142). These techniques enable ensuring of the driving stability of the vehicle and warm-up of the electric battery at the same time.

Unfortunately, the charging-discharging characteristics of the electric battery significantly deteriorate, for example, at a cryogenic temperature (deep freeze temperature) substantially below 0° C. In particular, the characteristics rapidly deteriorate during a charging operation. The electric battery repeatedly charged and discharged at significantly low temperature may have a decreased service life. Furthermore, the electric battery in the running vehicle may be unintentionally charged with the power regenerated by the motor regardless of the standby mode of the generator. Eagerly anticipated is a controlling apparatus to control power not to flow to the electric battery while the vehicle is being driven.

The deterioration of the cold electric battery can be prevented through the electrical disconnection of the electric battery from an electric circuit for avoiding the charge-discharge of the electric battery. Unfortunately, the disconnection of the electric battery from the electric circuit cannot provide a buffering effect (effect of reducing fluctuations in the voltage). In other words, the fluctuations in load directly affect a converter or an inverter in the electric circuit, resulting in an error in their operations.

SUMMARY

Technical Problems

An object of the invention, which has been accomplished to solve the above problems, is to provide a vehicle controlling system that can certainly protect an electric battery and devices in a circuit from deterioration and can ensure the driving stability of a vehicle. Another object of the invention is to provide advantageous effects that are derived from the individual features described in the Description of Embodiments below but not from conventional techniques.

Solution to Problems (1) A vehicle controlling system disclosed herein includes a high-voltage circuit including a motor for driving a vehicle and a generator driven by an engine; an intermediate-voltage circuit including a battery and having a lower potential than the high-voltage circuit; a low-voltage circuit having a lower potential than the intermediate-voltage circuit, accessories being disposed to the low-voltage circuit; a transformer disposed between the high-voltage circuit and the intermediate-voltage circuit; and a down converter disposed between the intermediate-voltage circuit and the low-voltage circuit.

The controlling system further includes a generator controller to control the generator such that the generator generates power equal to or higher than the sum of power consumed by the motor and power output from the transformer to the intermediate-voltage circuit at a temperature of the battery lower than a predetermined temperature.

The controlling system further includes a transformer controller to control the transformer such that the transformer outputs power equal to or lower than power output from the down converter to the low-voltage circuit at a temperature of the battery lower than the predetermined temperature.

(2) The transformer controller preferably adjusts the power output from the transformer to be equal to the difference of predetermined power from the power output from the down converter.

(3) The transformer controller preferably adjusts the predetermined power to be equal to or higher than a value that absorbs fluctuations in load on the low-voltage circuit.

(4) The vehicle controlling system preferably further includes a contactor disposed between the battery and the transformer and between the battery and the down converter in the intermediate-voltage circuit; and a capacitor connected to a node between the transformer and the down converter in the intermediate-voltage circuit. The capacitor is preferably grounded.

The transformer is also called "up-down converter", "transverter" or "AC-DC converter". The transformer increases or decreases the voltage of power transmitted between the high-voltage circuit and the intermediate-voltage circuit. The down converter is also called "DC-DC converter", "voltage depressor" or "step-down converter". The down converter decreases the voltage of power transmitted from the intermediate-voltage circuit to the low-voltage circuit.

Advantageous Effects

The vehicle controlling system can drive the motor and the accessories by power from the generator without charge to the battery, and thus can certainly protect the battery from deterioration while ensuring the driving stability of a vehicle.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein:

FIG. 3A illustrates a variation in charged-discharged power of a driving battery, FIG. 3B illustrates a variation in power output from a transformer, and FIG. 3C illustrates a variation in power output from a generator;

FIG. 6A illustrates a variation in charged-discharged power of an accessory battery, FIG. 6B illustrates a variation in power output from a transformer, and FIG. 6C illustrates a variation in power output from a down converter.

DESCRIPTION OF EMBODIMENTS

A vehicle controlling system according to embodiments will now be described with reference to the accompanying drawings. The embodiments are mere examples and do not intend to exclude application of various modifications or techniques that are not described in the embodiments. The individual features of the embodiments may be modified in various manners without departing from the gist and/or selectively employed as necessary or properly combined with one another.

1. First Embodiment

Figure 1:
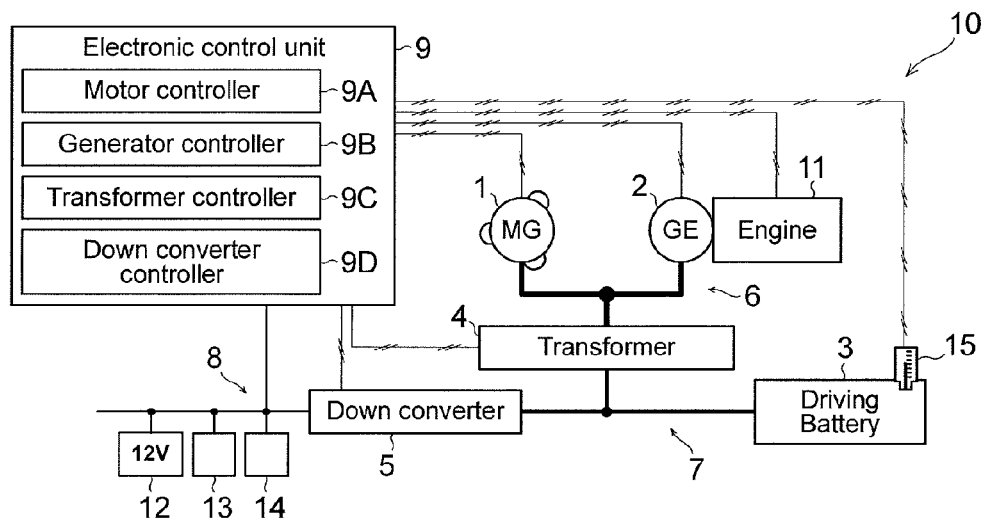
FIG. 1 is a schematic diagram of the configuration of a first embodiment.

A controlling system according to a first embodiment is applied to a vehicle 10 illustrated in FIG. 1. The vehicle 10 is a series hybrid vehicle. The vehicle 10 is equipped with a power train including a motor 1, a generator 2, and an engine 11. The engine 11 drives the generator 2 to make it generate power. The engine 11 can continue its operation within a range of revolutions that provides high efficiency, as required. The power from the generator 2 can be directly supplied to the motor 1 through a high-voltage circuit 6, and can be charged to a driving battery 3 through a transformer 4. The generator 2 also functions as a motor for starting the engine 11.

The motor 1 drives wheels by the power charged in the battery 3 and the power from the generator 2. The battery 3 is connected to an intermediate-voltage circuit 7, which has a maximum voltage lower than that of the high-voltage circuit 6. The battery 3 is provided with a thermosensor 15 for detection of the temperature of the battery 3. The detected information on the battery temperature is transmitted to an electronic control unit 9 (described below).

The transformer 4 controls the voltage of power transmitted between the intermediate-voltage circuit 7 and the high-voltage circuit 6 in both directions. The intermediate-voltage circuit 7 includes a down converter 5 for reducing the voltage of power from the intermediate-voltage circuit 7 and supplying the power to various electrical components (accessories) in a low-voltage circuit 8. Examples of the electrical components include an accessory battery 12, an air-conditioner 13, an electronic control unit 9, and another on-board controller 14, as illustrated in FIG. 1.

The high-voltage circuit 6 has the highest maximum voltage (potential), the intermediate-voltage circuit 7 has a maximum potential lower than that of the high-voltage circuit 6, and the low-voltage circuit 8 has the lowest maximum potential. The voltage in the high-voltage circuit 6 varies depending on the driving voltage of the motor 1 and the voltage of the power from the generator 2, and may increase up to approximately 600 [V], for example. The voltage in the intermediate-voltage circuit 7 varies depending on the charging-discharging voltage of the battery 3, and may vary within the range of 200 to 300 [V], for example. The voltage in the low-voltage circuit 8 drives the electrical components, and is approximately 11 to 12 [V], for example.

A charge-discharge mode of the battery 3 is determined based on the magnitude relationship between the battery voltage and the voltage in the intermediate-voltage circuit 7. For example, if the voltage applied by the transformer 4 from the high-voltage circuit 6 to the intermediate-voltage circuit 7 is higher than the battery voltage during a standby mode of the down converter 5; then the battery 3 is charged with the power output from the transformer 4; otherwise the battery 3 is not charged.

While the electrical components in the low-voltage circuit 8 are acting as loads during the operating mode of the down converter 5, the power from the intermediate-voltage circuit 7 is consumed in the low-voltage circuit 8. During the charge of the battery 3, the power input from the high-voltage circuit 6 to the intermediate-voltage circuit 7 (same as the power output from the transformer 4) is equal to the sum of the power consumed in the low-voltage circuit 8 and the power charged to the battery 3. In contrast, during the discharge of the battery 3, the power consumed in the low-voltage circuit 8 is equal to the sum of the power input from the high-voltage circuit 6 and the power discharged from the battery 3.

Accordingly, the adjustment of the power input from the high-voltage circuit 6 to be slightly lower than the power consumed in the low-voltage circuit 8 leads to avoidance of the unintentional charge to the battery 3 and maintenance of the discharge mode of the battery 3. On the basis of these characteristics, the electronic control unit 9 increases or decreases the power from the generator 2 and the power output from the transformer 4 to the intermediate-voltage circuit 7 in the running vehicle 10. The control on the power supply in the power train of the vehicle 10 thus prevents the unintentional charge to the battery 3 while continuously driving the vehicle 10.

The electronic control unit 9 includes a computer performing comprehensive controls on various devices in the power train. The computer is composed of, for example, an LSI (Large Scale Integrated circuit) device or embedded electronic device into which a microprocessor, a ROM (Read Only Memory), and a RAM (Random Access Memory) are integrated. The explanation in the embodiment focuses on a cryogenic control for driving the vehicle 10 and protecting the battery 3 at a cryogenic temperature. The electronic control unit 9 mainly controls the operations of the motor 1, the generator 2, the engine 11, the transformer 4, and the down converter 5 in response to the battery temperature detected by the thermosensor 15.

The cryogenic control starts at a battery temperature lower than a predetermined temperature (e.g., −30° C. to 0° C.). At a battery temperature equal to or higher than the predetermined temperature, a normal control is executed to drive the vehicle 10 by both the power charged in the battery 3 and the power from the generator 2. In the cryogenic control, the electrical components in the low-voltage circuit 8 are driven by both the power charged in the battery 3 and the power from the generator 2. In other words, the battery 3 remains connected to the intermediate-voltage circuit 7 during the cryogenic control, to activate the buffering effect of the battery 3.

Furthermore, the voltage in the intermediate-voltage circuit 7 is controlled to maintain the discharge mode of the battery 3 all the time. This control can prevent the battery 3 from deteriorating due to the unintentional charge at a cryogenic temperature. The control should not consume an excess amount of power from the battery 3 even though the control continues only until sufficient warm-up of the battery 3. The output from the transformer 4 is thus controlled to minimize the discharge from the battery 3. The minimized discharge contains a margin for fluctuations in loads on the electrical components. For example, the minimized discharge is controlled to several tens of watts to several hundred watts.

The electronic control unit 9 includes a motor controller 9A, a generator controller 9B, a transformer controller 9C, and a down converter controller 9D to execute the cryogenic control. These controllers may be achieved by electronic circuits (hardware), or may be programmed in the form of software. Alternatively, some of the functions of the controllers may be provided in the form of hardware while the other may be provided in the form of software.

The motor controller 9A controls the operation of the motor 1 such that the power consumed by the motor 1 (motor output) is equal to output power requested by a driver. The motor output is determined based on, for example, a pressing depth on an accelerator pedal, a vehicle speed, a road grade, an outside temperature, and an atmospheric pressure. The requested output power can be determined through any known technique.

The generator controller 9B controls the operations of the generator 2 and the engine 11 to increase or decrease the power to be generated. The power from the generator 2 (generator output) under the cryogenic control is equal to or higher than the sum of the power consumed by the motor 1 and the power output from the transformer 4 to the intermediate-voltage circuit 7. According to the embodiment, the generated power is set to be the sum of the power consumed by the motor 1 and the transformer output. The motor 1 under the cryogenic control is thus rotated by the power from the generator 2 alone without the power charged in the battery 3.

The transformer controller 9C controls the operation of the transformer 4 to increase or decrease power output from the high-voltage circuit 6 to the intermediate-voltage circuit 7 (transformer output). The power output from the transformer 4 under the cryogenic control is set to be the difference of predetermined power A from the power output from the down converter 5 to the low-voltage circuit 8. In other words, the transformer 4 under the cryogenic control supplies the intermediate-voltage circuit 7 with power slightly lower than the power consumed in the low-voltage circuit 8.

The "predetermined power A" is the power to be discharged from the battery 3. The predetermined power A is at least zero, and is preferably higher than fluctuations in loads on the electrical components in the low-voltage circuit 8. The predetermined power A may be a default value determined for the vehicle or the type of vehicle in advance, or may be a variable value depending on the conditions of the battery 3 (e.g., the temperature, the charged state (charging rate or SOC, SOC indicates "state of charge"), and the health conditions (deterioration rate or SOH, SOH indicates "state of health") of the battery 3. The power output from the transformer 4 is lower than the power consumed in the low-voltage circuit 8 by the predetermined power A. The predetermined power A is thus supplied from the battery 3, so that the discharge mode of the battery 3 is maintained.

The down converter controller 9D controls the operation of the down converter 5 such that the power output from the intermediate-voltage circuit 7 to the low-voltage circuit 8 (down-converter output) is equal to the power requested to be output from the electrical components. The requested output power from the electrical components is determined based on the types of the electrical components currently in operation and the operational modes of the electrical components. The requested output power can be determined through any known technique.

Figure 2:
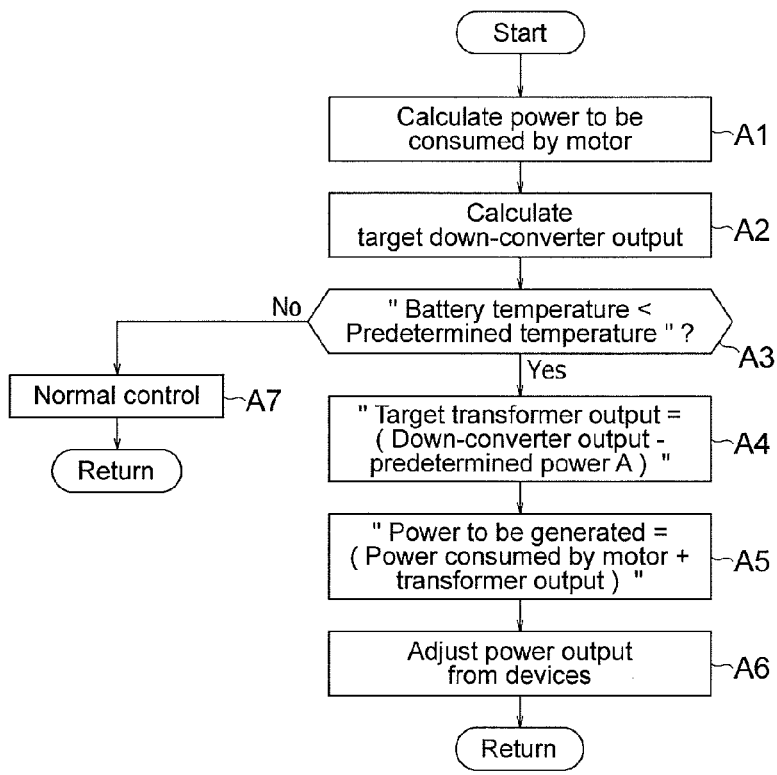
FIG. 2 is a flowchart illustrating a process of control at a cryogenic temperature.

FIG. 2 is a flowchart illustrating an example process of the cryogenic control. This process is repeated, for example, during the ON state of the main power supply of the vehicle 10. The engine 11 has already started. The motor controller 9A calculates target motor output (Step A1). The down converter controller 9D then calculates target down-converter output, which is the requested output power from the electrical components (Step A2). If the battery temperature is lower than the predetermined temperature (Step A3), the transformer controller 9C calculates target transformer output through the subtraction of the predetermined power A from the down-converter output (Step A4). The generator controller 9B calculates power to be generated through the addition of the motor output and the transformer output (Step A5). The operations of the devices, such as the motor 1, the generator 2, the transformer 4, and the down converter 5, are then controlled (Step A6). In contrast, if the battery temperature is the predetermined temperature or higher, the normal control is executed (Step A7). The details of the normal control may involve any known technique and the redundant explanation thereof is omitted.

Figure 3A:
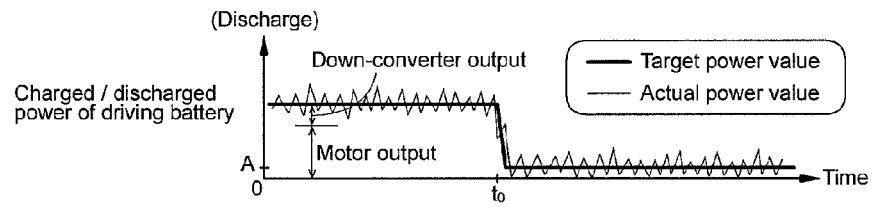
FIGS. 3A to 3C are graphs illustrating control according to the first embodiment.
Figure 3B:
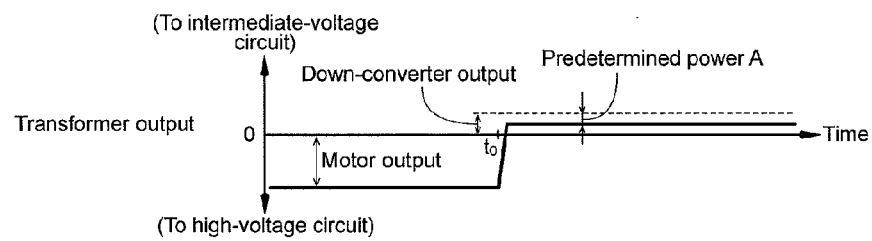
Figure 3C:
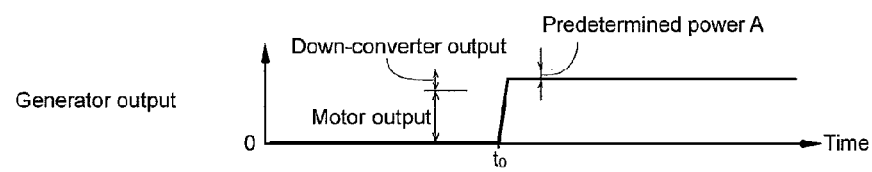

FIG. 3 is a graph illustrating power output from the devices at the beginning of the cryogenic control in the running vehicle 10. The explanation focuses on the case of a decrease in the battery temperature while the motor 1 is being driven by the power charged in the battery 3. The battery temperature decreases to the predetermined temperature at a time to in FIG. 3. Until the time to, the battery 3 is in a discharge mode and supplies power equal to the sum of the motor output and the down-converter output. The down-converter output is determined based on the requested output power from the electrical components in the low-voltage circuit 8. The transformer 4 supplies power equal to the motor output, from the intermediate-voltage circuit 7 to the high-voltage circuit 6. The generator output is zero.

If a condition for starting the cryogenic control is satisfied at the time $t_0$, the generator 2 in the high-voltage circuit 6 starts generation of power, which is set to be the sum of the motor output and the transformer output. The transformer 4 outputs power equal to the difference of the predetermined power A from the down-converter output, from the high-voltage circuit 6 to the intermediate-voltage circuit 7. In other words, the power from the generator 2 is equal to the difference of the predetermined power A from the sum of the motor output and the output power requested from the electrical components. This control can maintain the battery 3 to discharge the predetermined power A and can drive the motor 1 by the power from the generator 2.

The predetermined power A is higher than fluctuations in loads on the electrical components. The discharge current from the battery 3 is thus always positive (i.e., the charge current is always negative) regardless of variations in the operations of the electrical components. For example, actual discharged power illustrated with a thin solid line in FIG. 3A oscillates up and down around target discharged power illustrated with a thick solid line. In this control, the lower limit of the target discharged power is the predetermined power A, so that the actual power discharged from the battery 3 never falls below zero and the discharge mode of the battery 3 is maintained all the time.

2. Second Embodiment

Figure 4:
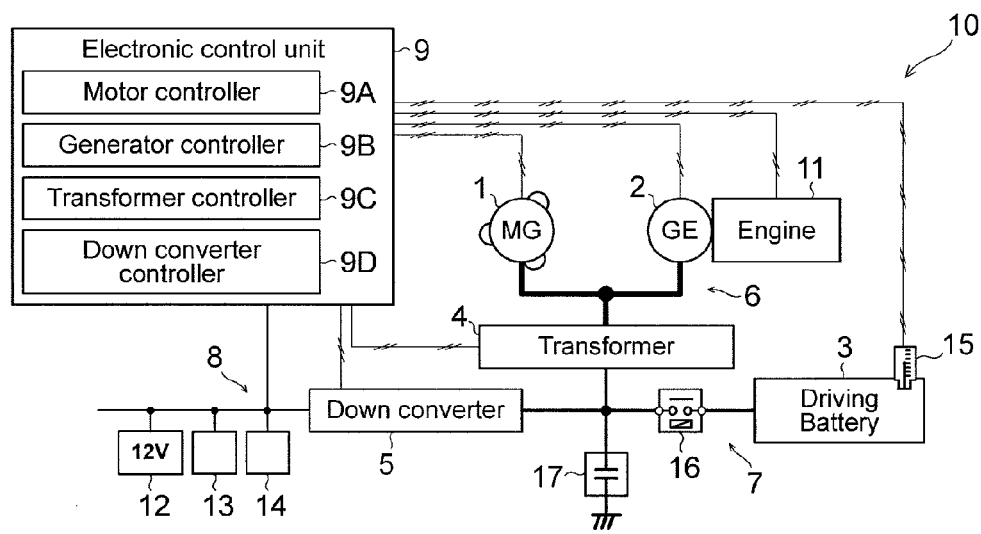
FIG. 4 is a schematic diagram of the configuration of a second embodiment.

FIG. 4 illustrates a vehicle 10 according to a second embodiment. The vehicle 10 is of the same type illustrated in FIG. 1 and further includes a contactor 16 and a capacitor 17 in the intermediate-voltage circuit 7. The contactor 16 is disposed between the battery 3 and the transformer 4, and also between the battery 3 and the down converter 5. The capacitor 17 is connected to a node between the transformer 4 and the down converter 5, and grounded. The elements corresponding to those in the first embodiment are referred to by the same reference signs to clarify the correspondence therebetween.

The contactor 16 is an electromagnetic switch functioning as a normally energized relay to connect or disconnect the battery 3 to or from the intermediate-voltage circuit 7. The contactor 16 is closed while receiving control signals from the electronic control unit 9 to close the circuit, and is opened while receiving no control signal to open the circuit.

The capacitor 17 provides a buffering effect during the open state of the contactor 16, in place of the battery 3. The capacitor 17 has a capacitance that can absorb fluctuations in loads on the electrical components.

If the charging rate of the battery 3 is lower than a predetermined rate under the cryogenic control, the electronic control unit 9 controls the contactor 16 into an open (disconnected) state. The transformer controller 9C adjusts the power output from the transformer 4 to be equal to the power output from the down converter 5 to the low-voltage circuit 8 (down-converter output) during the open state of the contactor 16. This control can prevent excess discharge from the battery 3. The control can also ensure the buffering effect and maintain the power balance in the electric circuit even if the contactor 16 is disconnected.

3. Third Embodiment

Figure 5:
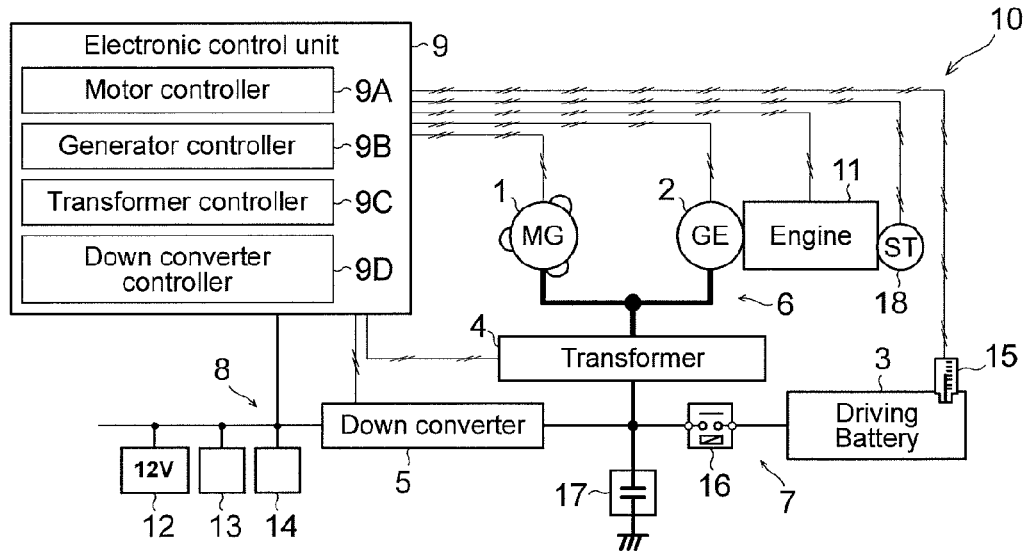
FIG. 5 is a schematic diagram of the configuration of a third embodiment.

FIG. 5 illustrates a vehicle 10 according to a third embodiment. The vehicle 10 is of the same type illustrated in FIG. 4 and further includes a starter 18 provided to the engine 11. The starter 18 is a motor driven by the power from the low-voltage circuit 8. The starter 18 starts the engine 11 in response to the start of the cryogenic control during the standby state of the engine 11, for example. The starter 18 has a gear ratio higher than that of the generator 2, and cranks the engine 11 by power of lower voltage and lower current than the power used in the cranking by the generator 2. The starter 18 starts the engine 11 by the power from the accessory battery 12 at the beginning of the cryogenic control. This configuration can prevent the discharge (i.e., the decrease in the charging rate) of the battery 3.

If the charging rate of the battery 3 is lower than the predetermined rate under the cryogenic control, the electronic control unit 9 controls the contactor 16 into an open (disconnected) state as in the second embodiment, and controls the starter 18 to start the engine 11. The starter 18 consumes the power from the accessory battery 12. The down converter controller 9D then increases the down-converter output immediately after the start of the engine 11 to compensate for the power consumed for starting the engine 11. For example, the down-converter output is set to be the sum of the requested output power from the accessories and predetermined power B, which is the power consumed by the accessory battery 12. This setting will be maintained for a predetermined time.

Figure 6A:
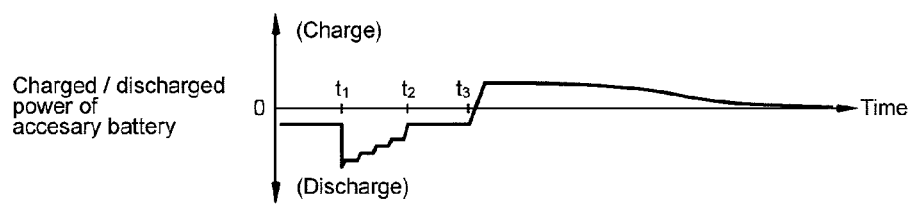
FIGS. 6A to 6C are graphs illustrating control according to the third embodiment.
Figure 6B:
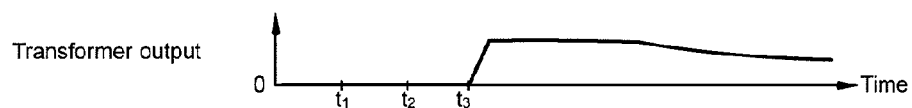

FIG. 6 is a graph illustrating power output from the devices at the beginning of the cryogenic control in the stationary vehicle 10. If the battery temperature is lower than the predetermined temperature and if the charging rate is lower than the predetermined rate at a time $t_1$, then the control opens the contactor 16 and initiates an operation for starting the engine 11. The starter 18 is driven by the power from the accessory battery 12. The transformer output and the down-converter output are both zero. The starter 18 finishes starting the engine 11 and stops its operation at a time $t_2$. The power from the accessory battery 12 is consumed by the accessories alone and is substantially constant from the time t2.

Figure 6C:
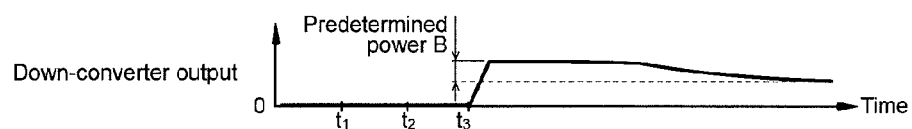

At a time $t_3$ after the elapse of a predetermined time from the time $t_2$, the control activates the transformer 4 and the down converter 5 and adjusts the power output from the respective devices. The down-converter output is set to be the sum of the requested output power from the electrical components and the predetermined power B. FIG. 6C illustrates an example variation in the down-converter output based on the predetermined power B varying with time. The transformer output is set to be the sum of the motor output (zero in the stationary vehicle) and the down-converter output. The accessory battery 12 is thus charged for a predetermined time from the time $t_3$ so as to restore the power consumed for starting the engine 11. The accessories are driven by the power from the generator 2.

4. Advantageous Effects (1) In the electronic control unit 9, the generator controller 9B adjusts the power from the generator 2 to be equal to or higher than the sum of the power consumed by the motor 1 and the transformer output. The transformer controller 9C adjusts the transformer output to be equal to the difference of the predetermined power A from the down-converter output. This adjustment can ensure the discharge of the predetermined power A from the battery 3, and thus can prevent the charge to the battery 3. Furthermore, the power from the generator 2 can simultaneously drive the motor 1 in the high-voltage circuit 6 and the accessories in the low-voltage circuit 8. This control can enhance the protection of the battery 3 at a cryogenic temperature while ensuring the driving stability of the vehicle 10.

During the cryogenic control, the battery 3 remains connected to the intermediate-voltage circuit 7, and thus can absorb fluctuations in the voltage in the intermediate-voltage circuit 7 by the buffering effect. This configuration can enhance the protection of the devices, such as the transformer 4 and the down converter 5, in a circuit including the battery 3, while ensuring the driving stability of the vehicle 10.

(2) The transformer controller 9C adjusts the power output from the transformer 4 to the intermediate-voltage circuit 7 to be equal to the difference of the predetermined power A from the down-converter output. This control on the transformer 4 can cause the battery 3 to share the burden of supplying the predetermined power A of the electrical load on the low-voltage circuit 8, and thus can maintain the discharge mode of the battery 3.

(3) The predetermined power A is a value that can absorb fluctuations in the electrical load on the low-voltage circuit 8. This control can maintain the discharge mode of the battery 3 regardless of a decrease in the load on the low-voltage circuit 8, for example, as illustrated in FIG. 3A. The control thus can enhance the protection of the battery 3.

(4) The intermediate-voltage circuit 7 may further include a contactor 16 and a capacitor 17, as illustrated in FIG. 4. In this case, the opening of the contactor 16 and the matching of the transformer output to the down-converter output lead to secure prevention of the charge to the battery 3, activation of the buffering effect, and maintenance of the power balance. This configuration can enhance the protection of the battery 3 while ensuring the driving stability of the vehicle 10

The invention should not be construed to be limited to the above-described embodiments and may be modified in various manners without departing from the gist. The individual features of the embodiments may be selectively employed as necessary or properly combined with one another.

The cryogenic control is executed in the single electronic control unit 9 in the above explanation. Alternatively, the control may be assigned to a plurality of control units in the vehicle 10. For example, in the vehicle 10 including an engine ECU for controlling the engine 11 and a motor ECU for controlling the motor 1, the ECUs may respectively include the generator controller 9B and the motor controller 9A. A similar modification can be applied to the specific configuration for detection of the battery temperature. In specific, the condition for starting the cryogenic control may also be determined based on the battery temperature calculated by a battery ECU for managing the conditions of the battery 3.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST 1 motor
2 generator
3 battery (driving battery)
4 transformer
5 down converter
6 high-voltage circuit
7 intermediate-voltage circuit
8 low-voltage circuit
9 electronic control unit
9A motor controller
9B generator controller
9C transformer controller
9D down converter controller
10 vehicle
11 engine
12 contactor
17 capacitor

The invention claimed is:

1. A vehicle controlling system comprising:
 a high-voltage circuit comprising a motor for driving a vehicle and a generator driven by an engine;
 an intermediate-voltage circuit comprising a battery and having a lower potential than the high-voltage circuit;
 a low-voltage circuit having a lower potential than the intermediate-voltage circuit, accessories being disposed to the low-voltage circuit;
 a transformer disposed between the high-voltage circuit and the intermediate-voltage circuit;
 a down converter disposed between the intermediate-voltage circuit and the low-voltage circuit;
 a generator controller to control the generator such that the generator generates power equal to or higher than a sum of power consumed by the motor and power output from the transformer to the intermediate-voltage circuit at a temperature of the battery lower than a predetermined temperature; and
 a transformer controller to control the transformer such that the transformer outputs power equal to or lower than power output from the down converter to the low-voltage circuit at a temperature of the battery lower than the predetermined temperature.

2. The vehicle controlling system according to claim 1, wherein the transformer controller adjusts the power output from the transformer to be equal to a difference of predetermined power from the power output from the down converter.

3. The vehicle controlling system according to claim 2, wherein the transformer controller adjusts the predetermined power to be equal to or higher than a value that absorbs fluctuations in load on the low-voltage circuit.

4. The vehicle controlling system according to claim 1, further comprising:
 a contactor disposed between the battery and the transformer and between the battery and the down converter in the intermediate-voltage circuit; and
 a capacitor connected to a node between the transformer and the down converter in the intermediate-voltage circuit.

5. The vehicle controlling system according to claim 2, further comprising:
 a contactor disposed between the battery and the transformer and between the battery and the down converter in the intermediate-voltage circuit; and
 a capacitor connected to a node between the transformer and the down converter in the intermediate-voltage circuit.

6. The vehicle controlling system according to claim 3, further comprising:
 a contactor disposed between the battery and the transformer and between the battery and the down converter in the intermediate-voltage circuit; and
 a capacitor connected to a node between the transformer and the down converter in the intermediate-voltage circuit.

* * * * *